(12) United States Patent
Groh et al.

(10) Patent No.: US 7,430,102 B2
(45) Date of Patent: Sep. 30, 2008

(54) PULSE WIDTH MODULATED SERVO CLUTCH DRIVER

(75) Inventors: Robert M. Groh, Blue Springs, MO (US); Jeremy D. Smith, Olathe, KS (US); Robert S. Sundquist, Paola, KS (US)

(73) Assignee: Honeywell International Inc., Morristown, NJ (US)

( * ) Notice: Subject to any disclaimer, the term of this patent is extended or adjusted under 35 U.S.C. 154(b) by 285 days.

(21) Appl. No.: 11/324,216

(22) Filed: Jan. 4, 2006

(65) Prior Publication Data

US 2007/0153444 A1 Jul. 5, 2007

(51) Int. Cl.
*H01H 9/00* (2006.01)
*H01H 47/00* (2006.01)
*H01H 51/22* (2006.01)
*H01H 51/30* (2006.01)
(52) U.S. Cl. ..................................... 361/160
(58) Field of Classification Search .................. 361/160
See application file for complete search history.

(56) References Cited

U.S. PATENT DOCUMENTS

| 4,922,160 | A | * | 5/1990 | Ogawa | ........................ 318/135 |
| 5,053,960 | A | * | 10/1991 | Brekkestran et al. | .......... 701/51 |
| 5,375,575 | A | * | 12/1994 | Ohishi et al. | ................ 123/446 |
| 2005/0211936 | A1 | * | 9/2005 | Tabor et al. | ............ 251/129.04 |

FOREIGN PATENT DOCUMENTS

JP           2004300952 A    *    3/2003

* cited by examiner

*Primary Examiner*—Michael J Sherry
*Assistant Examiner*—Tien Mai
(74) *Attorney, Agent, or Firm*—Ingrassia, Fisher & Lorenz, P.C.

(57) ABSTRACT

Disclosed is a system and method for controlling a clutch associated with a solenoid using a pulse width modulated (PWM) signal, which keeps the current through the coil constant over a wide temperature range and fluctuations in line voltage. The system may include a voltage source, a switch (such as a FET), a current sensor, and a processor. The system controls the clutch by sampling the voltage source, sampling the current measured by the current sensor, and computing a duty cycle, which is then used to generate a PWM control signal.

17 Claims, 3 Drawing Sheets

PULSE WIDTH MODULATED SERVO CLUTCH DRIVER

BACKGROUND OF THE INVENTION

1. Field of the Invention

The present invention involves clutch drivers. More particularly, the present invention involves drivers for controlling a solenoid over a wide range of temperatures and voltages.

2. Discussion of the Related Art

Solenoids are commonly used for engaging and disengaging servo clutches. FIG. 1 illustrates a related art mechanism 100 involving a servo clutch using a solenoid. Mechanism 100 includes a motor 105, an input drive shaft 117 connected to the motor 105, and a clutch 115 that includes a solenoid 120. The clutch includes a drive plate 116, which is connected to input drive shaft 117, and a load plate 122, which is connected to load drive shaft 110. The solenoid 120 includes a coil 121 that is connected to a power supply 125.

Adverse temperature conditions affect the function of related art mechanism 100. For example, under high temperatures, the resistance of coil 121 increases, which reduces the current through coil 121. The force that keeps clutch 115 engaged, referred to as a closure force, is equal to the current through coil 121 multiplied by the number of turns of wire within coil 121. The closure force relates to the torque handling capacity of clutch 115. As the temperature of coil 121 increases, the current may decrease to the point to where the closure force is insufficient to keep drive plate 116 and load plate 122 mechanically connected, and clutch 115 may slip or disengage. Under these conditions, the torque handling capacity is diminished and clutch 115 may slip at lesser loads than under nominal conditions.

A further problem associated with related art mechanism 100 is that the closure force provided by solenoid 120 is subject to line voltage fluctuations from the power supply 125. Reduction in line voltage reduces the current in coil 121, which may cause clutch 115 to disengage due to subsequent loss of closure force.

In order to maintain closure force at high temperatures and/or reduced line voltage, coil 121 may be designed for a worst case scenario with respect to high temperature and/or low line voltage. In doing so, coil 121 may be designed to nominally have sufficiently low resistance so that, if the coil resistance increases with temperature, and/or the line voltage decreases, the resistance does not increase to the point where the current in the coil is insufficient to maintain closure force. Accordingly, a coil 121 designed to maintain closure force under a worst case scenario will consume excess power under nominal conditions. The heat generated by coil 121, due to excess power consumption, may adversely affect its reliability. One possible effect of heat due to excess power consumption is the breakdown of insulation between turns of wire in the coil 121, which may lead to failure of coil 121. Further, heat generated by coil 121 may be transferred to other electronic components, adversely affecting their reliability.

Accordingly, there is a need for a servo clutch driver that can operate under a wide temperature range and maintain closure force in the presence of voltage fluctuations, while minimizing power requirements.

SUMMARY OF THE INVENTION

Accordingly, the present invention is directed to a pulse width modulated servo clutch driver that substantially obviates one or more of the problems due to limitations and disadvantages of the related art.

An advantage of the present invention is that it reduces stress on a solenoid under varying operating conditions.

Another advantage of the present invention is that it improves the performance of a solenoid subjected voltage and temperature fluctuations.

Another advantage of the present invention is that it reduces the power requirements for a clutch designed to operate under adverse conditions.

Additional features and advantages of the invention will be set forth in the description which follows, as well as the appended drawings.

In accordance with one aspect of the present invention, these and other advantages are achieved by a system for controlling a solenoid. The system comprises a voltage source connected to the solenoid; a current sensor for sensing a current through the solenoid; a switch for controlling the current through the solenoid; and a processor connected to the voltage source, the current sensor, and the switch, wherein the processor is configured to generate a PWM signal for controlling the current through the solenoid, wherein the PWM signal is based on a first signal associated with the voltage source and a second signal associated with the current sensor.

In another aspect of the present invention, the aforementioned advantages are achieved by a method for controlling a solenoid. The method comprises acquiring a line signal corresponding to a line voltage; acquiring a sensing signal corresponding to a current flowing through the solenoid; estimating a resistance based on the line signal, the sensing signal, and a previous duty cycle; computing a duty cycle based on the estimated resistance; and generating a pulse width modulated signal corresponding to the duty cycle.

In another aspect of the present invention, the aforementioned advantages are achieved by a system for controlling a solenoid. The system comprises means for providing a voltage; means for sensing a current flowing through the solenoid; means for switching current through the solenoid; means for computing a duty cycle based on the voltage, the current, an estimated resistance, a previously estimated resistance, and a previous duty cycle; and means for supplying a pulse width modulated signal to the means for switching current, wherein the pulse width modulated signal is based on the duty cycle.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
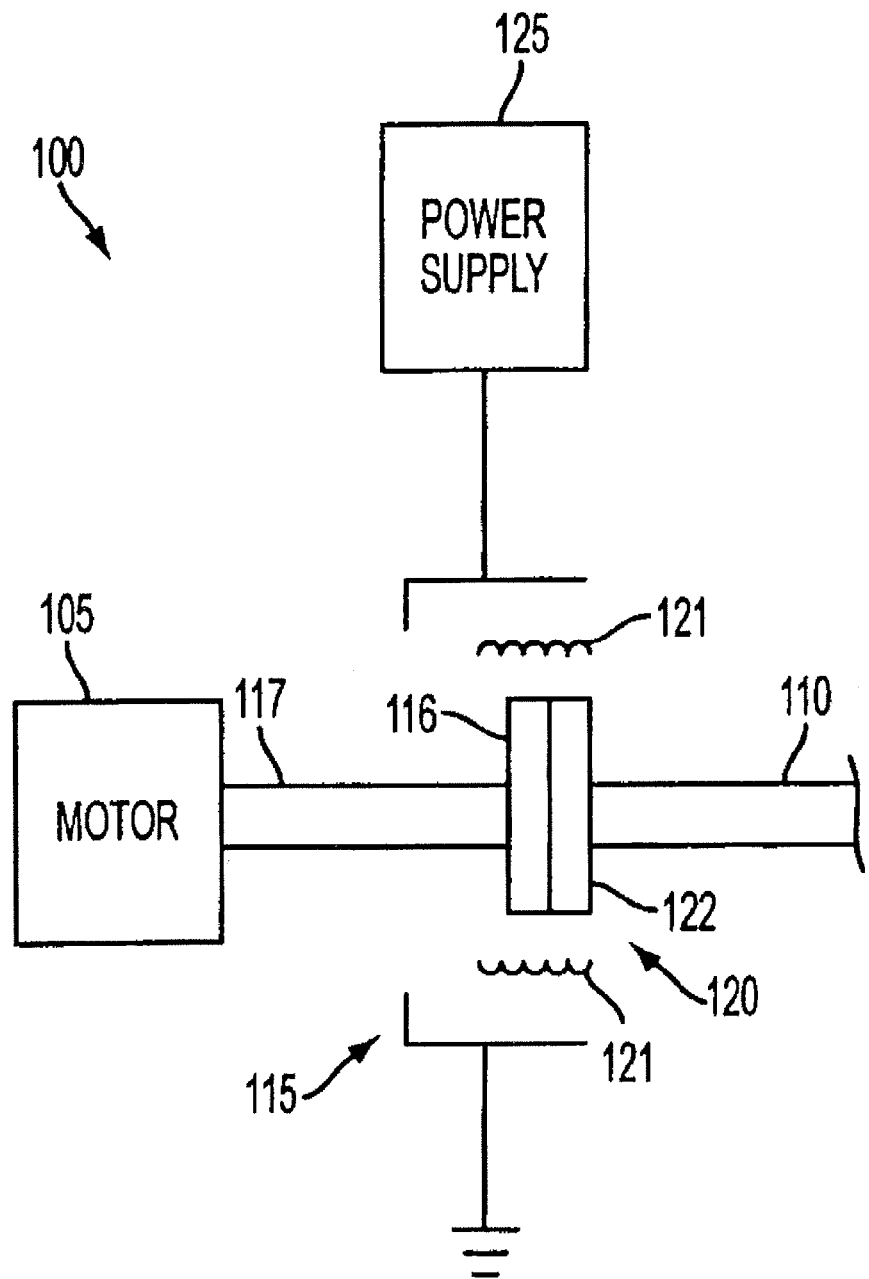
FIG. 1 illustrates a related art servo clutch using a solenoid.
Figure 2:
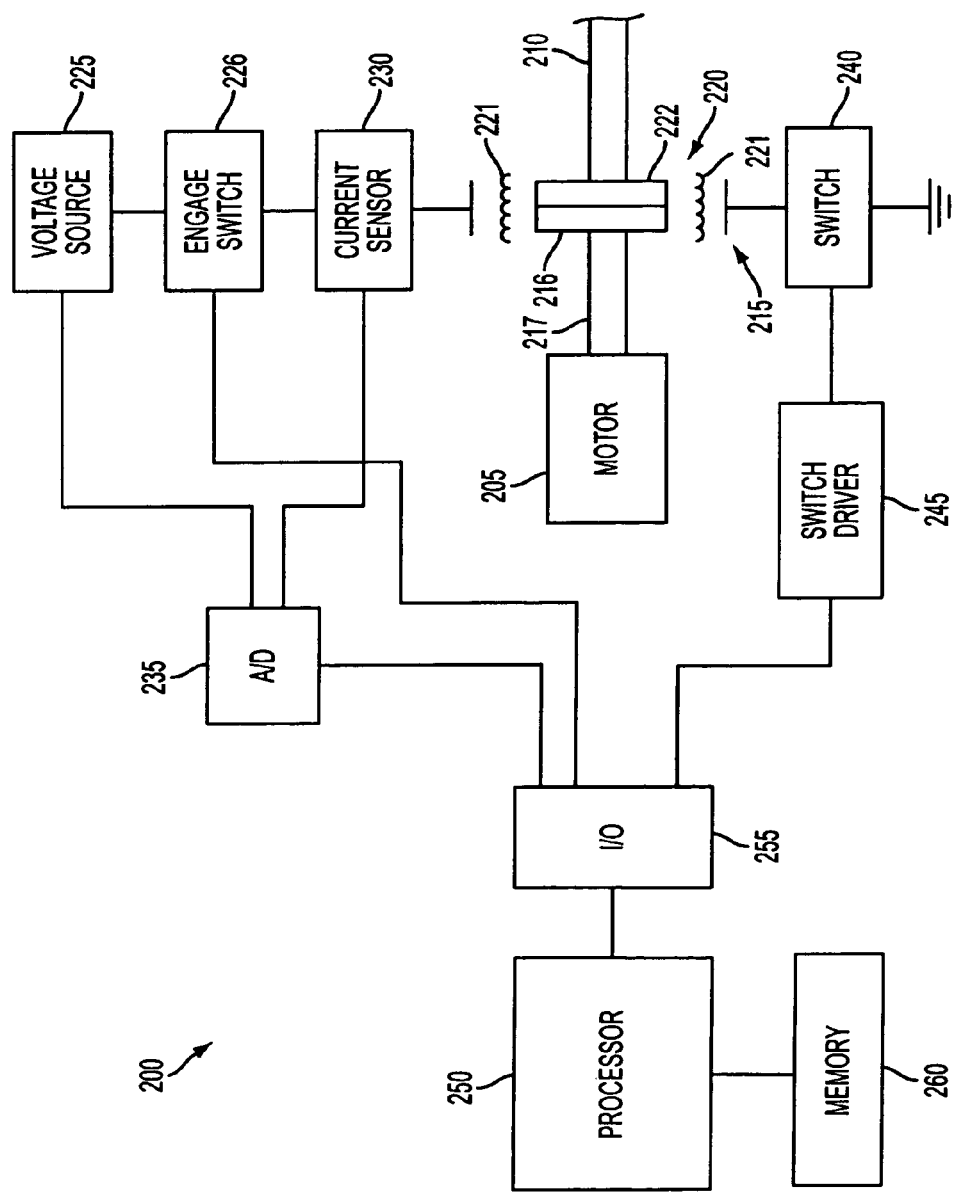
FIG. 2 illustrates an exemplary system for driving a servo clutch according to the present invention.

FIG. 2 illustrates an exemplary system 200 for driving a servo clutch according to the present invention. As stated previously, changes in coil resistance (due to changes in temperature) and fluctuations in line voltage can, in turn, cause the coil current to fluctuate. If the coil current decreases too much, it could cause the clutch to disengage. On the other hand, if the coil current increases too much, the coil will consume excess power. Thus, system 200 prevents the coil current from dropping below the amount of current that is necessary for the clutch to maintain the required amount of closure force on the shaft. Similarly, system 200 prevents the coil from consuming excess power at other temperatures and/or line voltages. System 200 achieves this, in general, by controlling the pulse width modulation (PWM) duty cycle of the coil current $I_C$, in the presence of temperature dependent fluctuations in coil resistance, and/or in the presence of fluctuations in the line voltage. By controlling the PWM duty cycle of the coil current $I_C$, system 200 is able to maintain the coil current $I_C$, at a substantially constant level. By holding the coil current $I_C$ substantially constant, a substantially constant closure force is maintained and excess power dissipation is minimized.

Coil resistance may change considerably with temperature. For example, copper has a temperature variation of 0.393% per ° C. Accordingly, a temperature variation of ±75° C. corresponds to a ±29.5% change in coil resistance. If the coil is designed to have an operating current of 1 A at 100° C., then the coil current at −55° C. would be about 1.59 A (i.e., the coil resistance would have dropped from about 28Ω to about 17.6Ω).

FIG. 2 illustrates an exemplary system 200 for driving a servo clutch according to the present invention. System 200 includes a motor 205 connected to an input drive shaft 217, and a clutch 215. Clutch 215 has a drive plate 216 connected to input drive shaft 217, a load plate 222 connected to a load drive shaft 210, and a solenoid 220. Solenoid 220 includes a coil 221. System 200 further includes a voltage source 225; an engage switch 226; a current sensor 230; and a PWM switch 240, which is connected to a switch driver 245. Current sensor 230 may be connected to an analog to digital (A/D) converter 235. A/D converter 235 and the switch driver 245 are connected to a processor 250 via an input/output (I/O) module 255. Processor 250 has a memory 260, which is encoded with software (hereinafter "the software") for performing processes associated with the present invention.

The present invention is particularly applicable to aircraft, such as autopilot systems, but the scope of the present invention is not limited thereto. It will be readily apparent to one of ordinary skill that system 200 may find applications in any system in which closure force must be maintained under a wide ranges of temperature and voltage. Generally, aircraft applications require that system 200 be able to maintain closure force in external ambient temperatures ranging from −55° C. to +70° C. Further to aircraft applications, the voltage is nominally 28V, which may be expected to vary between 18V and 32V.

Clutch 215 may be designed or selected so that it will maintain closure force, when subjected to required torque loading, over the required temperature and voltage range (above). Clutch 215 may include a "flyback" diode (not shown) connected across coil 221, which may allow current to continue flowing through coil 221 when PWM switch 240 and engage switch 226 are turned off.

Coil 221 may be selected or designed to maintain closure force under worst case conditions. Worst case conditions may include the maximum expected temperature (e.g., +70° C.) and/or the lowest expected voltage (e.g., 18V). A particular version of coil 221 may have a time constant of about 5 msec, which corresponds to a break frequency of about 200 rad/sec or about 30 Hz, and a nominal resistance of about 7.6Ω. However, one of ordinary skill will appreciate that the characteristics of coil 221 may vary, depending on the specific application.

Voltage source 225 provides a line voltage ($V_A$). Voltage source 225 may be a DC voltage supply that is capable of providing sufficient current through coil 221 of solenoid 220 so that sufficient closure force is maintained by clutch 215 to remain engaged under worst case conditions. As mentioned above, in an aircraft application, the line voltage $V_A$ is nominally 28V, which may be expected to vary between 18V and 32V. It will be understood that, depending on the application, voltage source 225 may produce a different nominal voltage level subject to different variations. In addition to providing a line voltage, voltage source 225 may also provide an analog output signal that is connected to A/D converter 235. The analog output signal corresponds to line voltage $V_A$.

Engage switch 226 is connected to processor 250 via I/O port 255. Engage switch 226 enables clutch 215 to be disengaged, by switching off the current from voltage source 225, in the event of a failure of PWM switch 240.

PWM switch 240 is a device that is capable of switching high currents. Such devices might involve a field effect transistor (FET), a power bi-polar junction transistor (BJT) or a relay having a switching rate between 1 kHz and 200 kHz, compatible with pulse width modulation PWM schemes. Generally, PWM switch 240 should have a switching frequency such that multiple PWM switching cycles occur within one time constant of coil 221. Otherwise, if PWM switch 240 switches more slowly than the time constant of coil 221, clutch 215 may alternately engage and disengage with respective "on" and "off" switching of PWM switch 240. In other words, the switching frequency of PWM switch 240 should be much greater than the break frequency of coil 221, wherein break frequency is the inverse of the time constant converted to Hz. By switching faster than the time constant of coil 221, the magnetic field generated by coil 221 stores the energy necessary to maintain closure force during the "off" periods of PWM switching.

Switch driver 245 is connected to the output terminal of I/O module 255, and it provides a signal to PWM switch 240 in response to a signal from I/O module 255. Switch driver 245 may include an integrated circuit (IC), such as a PWM driver IC, or a similar device. If PWM switch 240 involves a FET, switch driver 245 may provide a voltage between the gate and source ($V_{GS}$) of the FET.

Current sensor 230 senses the current ($I_C$) flowing through coil 221 of solenoid 220. Current sensor 230 outputs an analog sense voltage ($V_S$) that is proportional to current $I_C$ flowing through coil 221. Current sensor 230 may include a sense resistor and an amplifier (both not shown) that amplifies the voltage across sense resistor. The sense resistor may have a low resistance, such as about 0.3Ω, although other resistances may be used provided that it is low compared to the resistance of coil 221. Alternatively, current sensor 230 may include an integrated circuit (IC) that has an internal sense resistor. It would be readily apparent to one of ordinary skill that current sensor 230 may detect the current flowing through coil 221 using other approaches.

A/D converter 235 is connected to voltage source 225 and current sensor 230. A/D converter 235 converts the analog signals from voltage source 225 and current sensor 230 into digital values. A/D converter 235 may be a stand-alone component within system 200, or it may be integrated into I/O module 255. One of ordinary skill will recognize that many implementations of A/D converter 235 are possible and within the scope of the invention.

I/O module 255 provides processor 250 with an interface for input/output digital signals. I/O module 225 may be integrated into processor 250.

Processor 250 may be an embedded processor that is co-located with clutch 215, or it may be remotely located. Processor 250 may be dedicated to system 200, or it may be shared by systems other than system 200. Processor 250 is connected to memory 260.

Memory 260 may co-located with, or integrated into, processor 250. Memory 260 may be remotely located and may be distributed among various components and databases, and may communicate with processor 250 over a network connection. It will be readily apparent to one of ordinary skill that many different architectures for processor 250 and memory 260 are possible and within the scope of the invention. The software stored in memory 260 contains instructions and data for implementing the present invention.

Figure 3:
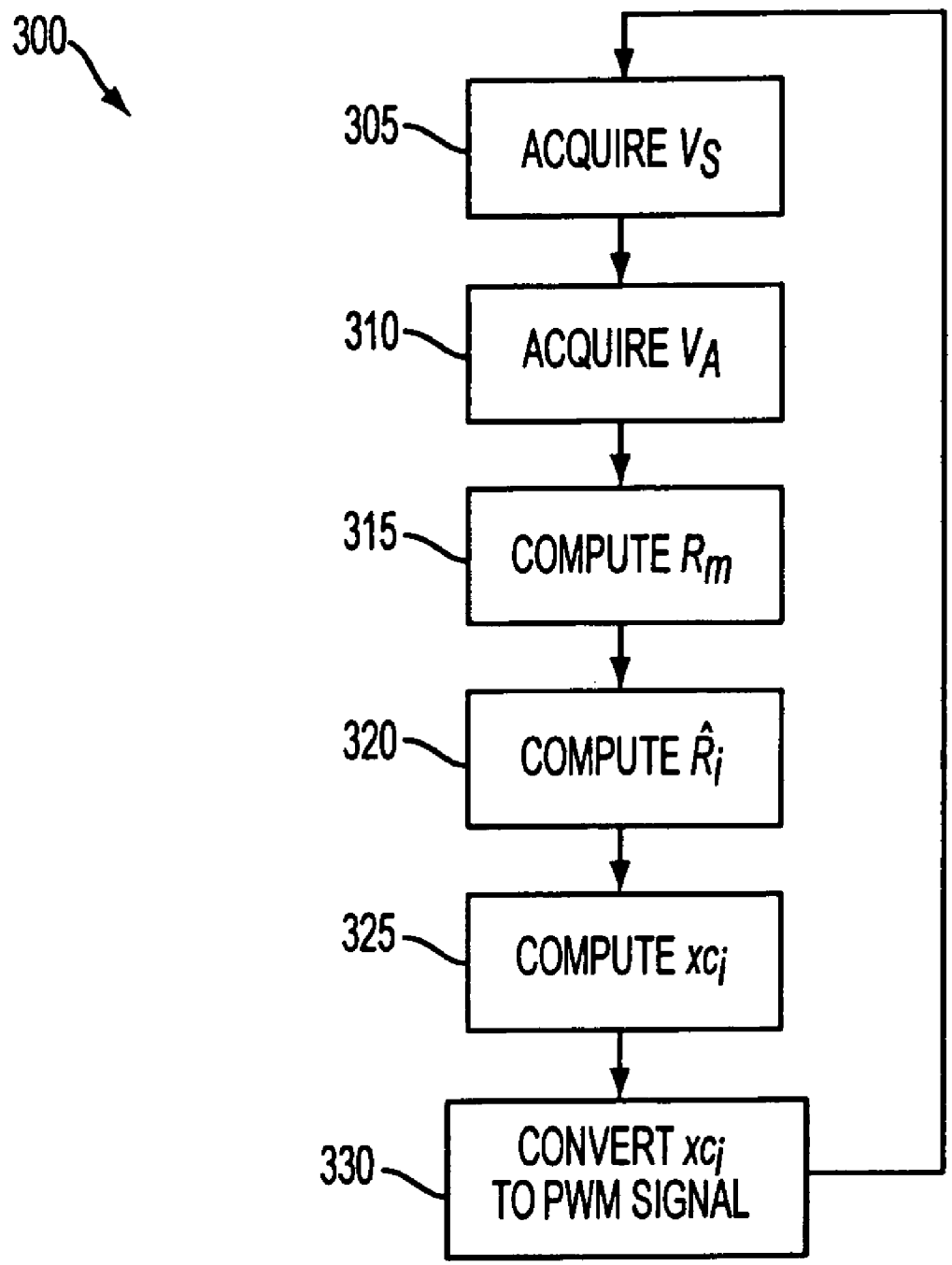
FIG. 3 is a diagram of a process for deriving a pulse width modulated control signal for a servo clutch.

FIG. 3 is a diagram of exemplary process 300 for generating a PWM signal for controlling clutch 215 according to the present invention. It will be understood that the various exemplary steps associated with process 300, illustrated in FIG. 3, may be implemented through software, hardware, firmware or a combination thereof. However, for purposes of illustration only, process 300 will be described herein below as if implemented in software stored in memory 260.

As stated previously, fluctuations in coil resistance (due to changes in temperature) and line voltage $V_A$ can, in turn, cause the current $I_C$ to fluctuate. If the current $I_C$ decreases too much, it could cause clutch 215 to disengage. On the other hand, if the current $I_C$ increases too much, coil 221 will consume excess power. Thus, process 300 prevents the current $I_C$ from dropping below the amount of current that is necessary for clutch 215 to maintain the required amount of closure force between drive plate 216 and load plate 222, thereby preventing clutch 215 from disengaging. Similarly, process 300 prevents the current $I_C$ from increasing to where coil 221 consumes excess power. In general, process 300 achieves this by controlling the PWM duty cycle of the current $I_C$, in the presence of temperature dependent fluctuations in coil resistance, and/or in the presence of fluctuation in line voltage $V_A$. By controlling the PWM duty cycle of the current $I_C$, process 300 is able to maintain the current $I_C$ at a substantially constant level, despite the aforementioned adverse conditions relating to temperature, coil resistance and line voltage fluctuations.

Referring back to FIG. 3, step 305 involves acquiring sense voltage $V_S$ from current sensor 230. As stated, current sensor 230 includes, for example, a resistor whereby the sense voltage $V_S$ can be acquired by measuring the voltage drop across the resistor. Current sensor 230 then provides, via A/D converter 235 and I/O module 255, a signal reflecting sense voltage $V_S$ to processor 250. In step 310, processor 250 acquires line voltage $V_A$ from voltage source 225 via A/D 235 and I/O module 255.

In step 315, the software computes an intermediate resistance $R_m$ using the voltage values $V_A$ and $V_S$ acquired in steps 305 and 310 according to the following relation:

$$R_m = \frac{V_A (xc_{i-1})^2 R_S}{V_S}$$

where $R_S$ is the resistance of the sense resistor in current sensor 230 (e.g., 0.3Ω), and $xc_{i-1}$ is the duty cycle computed in the previous iteration of process 300. If this is the first iteration of process 300, $xc_{i-1}$ may be a default initial value that is stored in memory 260.

In step 320, the software estimates the combined resistance $\hat{R}$ of the coil and the sense resistor. The estimated resistance $\hat{R}$ is a filtered version of intermediate resistance $R_m$. Intermediate resistance $R_m$ is filtered to mitigate step changes or otherwise rapid changes in line voltage $V_A$. The estimated resistance may be filtered by basing the current estimated resistance on the previous estimated resistance and the previous duty cycle $xc_{i-1}$ according to the following relation:

$$\hat{R}_i = \hat{R}_{i-1} + K \cdot xc_{i-1} \cdot (R_m - \hat{R}_{i-1})$$

where $\hat{R}_i$ is the estimated resistance for the current iteration of process 300, $\hat{R}_{i-1}$ is the estimated resistance of the previous iteration of process 300, $xc_{i-1}$ is the duty cycle computed in the previous iteration of process 300, and K is a gain factor. Gain factor may be set to a value between 0 and 1, such as about 0.25. For the first iteration of process 300, previous estimated resistance $\hat{R}_{i-1}$, like the previously computed duty cycle $xc_{i-1}$, may be a "best guess," or some other default value, which is stored in memory 260.

The procedure described above with respect to step 320 is one of many possible approaches to filtering the intermediate resistance. One of ordinary skill will recognize that other filter implementations are possible and within the scope of the invention.

In step 325, the software computes a value for the duty cycle $xc_i$ according to the following relation:

$$xc_i = \frac{V_S \cdot \hat{R}_i}{V_A \cdot R_S}$$

Further to step 325, the software stores the values for the estimated resistance $\hat{R}_i$ and the duty cycle $xc_i$, which will respectively be $\hat{R}_{i-1}$ and $xc_{i-1}$ for the next iteration of process 300.

In step 330, the software converts the duty cycle $xc_i$ into a PWM signal. It may do this in one of several ways. First, the software may synthesize a digital signal based on a PWM frequency, which is a parameter that may be stored in memory 260, and the duty cycle $xc_i$. The software may transmit this synthesized digital signal to switch driver 245 through I/O module 255. Second, the software may send duty cycle $xc_i$ value to switch driver 245 through I/O module 255. In the latter case, switch driver 245 has a device, such as an IC or an embedded processor or microcontroller, that generates the PWM signal based on the duty cycle $xc_i$ provided by the software. It will be readily apparent to one of ordinary skill that other ways of generating a PWM signal based on the duty cycle $xc_i$ are possible and within the scope of the invention.

Process 300 generates a PWM signal, which is provided to PWM switch 240, for maintaining a substantially constant current $I_C$ through coil 221 when coil 221 is subject to changes in temperature and line voltage $V_A$.

The estimated resistance $\hat{R}$ changes with temperature. Accordingly, the PWM duty cycle increases with temperature (and coil resistance) and diminishes with reduced temperature (and reduced coil resistance). The period of the PWM signal is much less than the time constant of coil 221 (i.e., the PWM frequency is much greater than the brake frequency of coil 221). Accordingly, given the time constant of coil 221, the current $I_C$ through coil 221 is held substantially constant. The energy stored by the magnetic field generated by coil 221 is maintained, and closure force is held substantially constant.

Similarly, the estimated resistance $\hat{R}$ changes with fluctuations in line voltage $V_A$. As such, the PWM duty cycle increases with an decrease in line voltage $V_A$ and decreases with an increases in line voltage $V_A$. Accordingly, given the time constant of coil 221 and the frequency of the PWM signal, the current $I_C$ through coil 221 is held substantially constant. The energy stored by the magnetic field generated by coil 221 is maintained, and closure force is held substantially constant.

Variations to system 200 are possible and within the scope of the invention. For example, PWM switch 240 may be connected between clutch 215 and ground, or between voltage source 225 and clutch 215. PWM switch 240 and current sensor 230 may be both connected between voltage source 225 and clutch 215, both may be connected between clutch 215 and ground, and each may be connected at either end of clutch 215. Further, voltage source 225 and current sensor 230 may have integrated A/D converters, which may provide digital signals directly to I/O module 255. In such a case, processor 250 may communicate with voltage source 225 and current sensor 230 via a data communication protocol. Accordingly, I/O module 255, voltage source 225, current sensor 230, and switch 245 may be connected to a single serial data bus. One of ordinary skill will readily recognize that many data communication schemes are possible and within the scope of the invention.

In another variation of system 200, switch driver 245 is omitted, and processor 250 communicates with switch 240 via I/O module 255.

In another variation, system 200 may be implemented using analog circuitry. In this case, processor 250 may be an analog feedback circuit, and A/D converter 235, I/O module 255, and memory 260 may be omitted.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system for controlling a solenoid, comprising:
   a voltage source connected to the solenoid;
   a current sensor for sensing a current through the solenoid;
   a switch for controlling the current through the solenoid;
   a processor connected to the voltage source, the current sensor, and the switch, wherein the processor is configured to maintain a substantially constant current through the solenoid to compensate for changes to the voltage source or the solenoid resistance by generating a PWM signal for controlling the current through the solenoid, and wherein the PWM signal is based on a first signal associated with the voltage source and a second signal associated with the current sensor, wherein the processor comprises a computer readable medium encoded with a program for:
   acquiring a line signal from the voltage source;
   acquiring a sense signal from the current sensor;
   computing a duty cycle based on the line signal and the sense signal; and
   computing an intermediate resistance based on the line signal, the sense signal, a sense resistance, and a previous duty cycle; and
   a switch driver connected between the processor and the switch.

2. The system of claim 1, wherein the computer readable medium is further encoded with a program for sending the duty cycle to the switch driver.

3. The system of claim 1, wherein the computer readable medium is further encoded with a program for estimating a resistance based on a previously estimated resistance, the previous duty cycle, and a gain factor.

4. The system of claim 3, wherein the program for computing the duty cycle includes a program for computing the duty cycle based on the estimated resistance.

5. The system of claim 3, wherein the computer readable medium is further encoded with a program for storing the duty cycle and the estimated resistance.

6. The system of claim 1, further comprising a clutch coupled to the solenoid.

7. The system of claim 6, further comprising a motor coupled to the clutch.

8. The system of claim 1, wherein the current sensor comprises: a sense resistor; and an amplifier for amplifying a voltage across the sense resistor.

9. A method for controlling a solenoid, comprising:
   acquiring a line signal corresponding to a line voltage;
   acquiring a sense signal corresponding to a current flowing through the solenoid;
   estimating a resistance based on the line signal, the sense signal, and a previous duty cycle;
   computing a duty cycle based on the estimated resistance; and
   generating a pulse width modulated signal corresponding to the duty cycle.

10. The method of claim 9, further comprising providing the pulse width modulated signal to a switch connected to the solenoid.

11. The method of claim 10, wherein providing the pulse width modulated signal comprises providing the duty cycle to a switch driver connected to the switch.

12. The method of claim 9, wherein estimating the resistance comprises filtering an intermediate resistance.

13. The method of claim 9, wherein acquiring the sense signal comprises sampling the sense signal at a sample rate based on a time constant corresponding a solenoid coil.

14. The method of claim 13, wherein the sample rate is greater than two times the reciprocal of the time constant.

15. The method of claim 9, wherein estimating the resistance comprises computing a square of the previous duty cycle.

16. The method of claim 9, further comprising storing the estimated resistance and the duty cycle.

17. A system for controlling a solenoid, comprising:
   means for providing a voltage;
   means for sensing a current flowing through the solenoid;
   means for switching current through the solenoid;
   means for computing a duty cycle based on the voltage, the current, an estimated resistance, a previously estimated resistance, and a previous duty cycle; and
   means for supplying a pulse width modulated signal to the means for switching current, wherein the pulse width modulated signal is based on the duty cycle.

* * * * *